(12) United States Patent
Muratsu (10) Patent No.: US 11,114,882 B2
(45) Date of Patent: Sep. 7, 2021

(54) POWER CONVERTER

(71) Applicant: Fuji Electric Co., Ltd., Kanagawa (JP)

(72) Inventor: Hiroki Muratsu, Hyogo (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 139 days.

(21) Appl. No.: 16/433,422

(22) Filed: Jun. 6, 2019

(65) Prior Publication Data

US 2020/0036210 A1 Jan. 30, 2020

(30) Foreign Application Priority Data

Jul. 25, 2018 (JP) .............................. JP2018-139745

(51) Int. Cl.
| | |
|---|---|
| *H02J 7/00* | (2006.01) |
| *H02J 7/02* | (2016.01) |
| *H02J 7/06* | (2006.01) |
| *H02M 1/00* | (2006.01) |
| *H02M 3/158* | (2006.01) |
| *H02M 5/458* | (2006.01) |
| *H02M 7/219* | (2006.01) |
| *H02M 7/5387* | (2007.01) |
| *H02M 1/08* | (2006.01) |

(52) U.S. Cl.
CPC ............ *H02J 7/022* (2013.01); *H02J 7/0068* (2013.01); *H02J 7/06* (2013.01); *H02M 1/00* (2013.01); *H02M 3/158* (2013.01); *H02M 5/4585* (2013.01); *H02M 7/219* (2013.01); *H02M 7/5387* (2013.01); *H02M 1/007* (2021.05); *H02M 1/08* (2013.01)

(58) Field of Classification Search
CPC .. H02J 7/0068; H02J 7/022; H02J 7/06; H02J 9/062; H02J 7/34; H02M 1/00; H02M 3/158; H02M 5/4585; H02M 7/219; H02M 7/23; H02M 7/493; H02M 7/5387; H02M 1/08; H02M 2001/007; H02M 7/487
USPC ......................................................... 307/33
See application file for complete search history.

(56) References Cited

U.S. PATENT DOCUMENTS

| | | | |
|---|---|---|---|
| 2016/0276844 A1* | 9/2016 | Gekinozu | ................ H02J 5/00 |
| 2018/0076657 A1* | 3/2018 | Nishimura | .......... H02M 5/4585 |

FOREIGN PATENT DOCUMENTS

JP 2014-230418 A 12/2014

\* cited by examiner

*Primary Examiner* — Toan T Vu
(74) *Attorney, Agent, or Firm* — Chen Yoshimura LLP (57) ABSTRACT

A power converter includes a plurality of power conversion units connected to one another in parallel, each including an AC/DC converter (rectifier) that converts AC power from an AC input power supply (commercial power supply) into DC power, a DC/DC converter (DC power converter) that converts the DC power from the AC/DC converter, and a current detector that detects charge current flowing from the DC/DC converter as well as discharge current flowing to the DC/DC converter. The power converter further includes a battery (electrical storage unit) that is charged by a subset of DC/DC converters among the DC/DC converters of the plurality of power conversion units, as well as a CPU (controller) that controls the DC/DC converters of the plurality of power conversion units.

14 Claims, 5 Drawing Sheets

POWER CONVERTER

BACKGROUND OF THE INVENTION

Technical Field

The present invention relates to a power converter, and more particularly to a power converter which includes a plurality of power conversion units connected to one another in parallel.

Background Art

Power converters that include a plurality of power conversion units connected to one another in parallel are conventionally well-known (see Patent Document 1, for example).

The uninterruptible power supply system in Patent Document 1 includes two uninterruptible power supplies, each including a converter, an inverter, and a DC/DC converter. These two uninterruptible power supplies are connected to one another in parallel. Moreover, this uninterruptible power supply system further includes a shared battery that is charged and discharged by both of the two uninterruptible power supplies. Each uninterruptible power supply utilizes the converter thereof to convert AC power from a commercial AC power supply to DC power, utilizes the DC/DC converter thereof to step down the DC power converted by the converter, and supplies the resulting power to the shared battery. In this case, it is conceivable that the battery could be charged by both of the two uninterruptible power supplies simultaneously, although this is not explicitly described in Patent Document 1. In addition, each uninterruptible power supply includes a current detector for detecting both charge current and discharge current between the DC/DC converter and the battery.

RELATED ART DOCUMENTS

Patent Documents

Patent Document 1: Japanese Patent Application Laid-Open Publication No. 2014-230418

SUMMARY OF THE INVENTION

In general, charge current supplied to a battery is controlled to be relatively small in comparison to discharge current from the battery. Moreover, current detectors that are capable of detecting currents of large magnitude typically have relatively low resolution. Therefore, when a current detector detects both charge current and discharge current as in the uninterruptible power supply system in Patent Document 1, a current detector that can detect the discharge current (which has relatively large magnitude) will have relatively low resolution. In this case, using such a current detector that has relatively low resolution is disadvantageous because it becomes difficult to accurately detect the charge current (which has relatively small magnitude). Therefore, due to the low charge current control accuracy, battery overcharging or the like can occur and cause problematic degradation of the battery.

The present invention was made to solve the abovementioned problems, and one object of the present invention is to provide a power converter which makes it possible to improve charge current control accuracy.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a power converter, including: an electrical storage unit; a plurality of power conversion units connected to one another in parallel, each of the power conversion units including: a rectifier that converts AC power from a commercial power supply into DC power, a DC power converter that is connected to the rectifier on one end and connected to the electrical storage unit on another end and that converts the DC power from the rectifier when charging the electrical storage unit and converts DC power from the electrical storage unit when discharging the electrical storage unit, and a current detector that detects charge current that flows from the DC power converter to the electrical storage unit as well as discharge current that flows to the DC power converter from the electrical storage unit; and a controller that controls the respective DC power converters of the plurality of power conversion units such that when charging the electrical storage unit, only a subset of the DC power converters, not all of the DC power converters, among the respective DC power converters of the power conversion units charges the electrical storage unit.

Here, the charge current that flows to a single current detector takes a value equal to the charge current that flows to the electrical storage unit divided by the number of power conversion units (DC power converters) being used for charging. Thus, in the power converter according to this aspect of the present invention as described above, charging the electrical storage unit using a subset of DC power converters among the DC power converters of the plurality of power conversion units makes it possible to increase the charge current that flows to a single current detector in comparison to if all of the DC power converters were used for charging. As a result, even if in order to detect the discharge current a current detector with relatively low resolution is used to detect current, the charge current can be detected more accurately than if the electrical storage unit was charged using all of the DC power converters, thereby making it possible to improve charge current control accuracy.

In the power converter according to the aspect described above, when discharging from the electrical storage unit, the controller may activate all of the DC power converters of the plurality of power conversion units. This configuration makes it possible to make the discharge current that flows to a single current detector smaller than if a subset of the DC power converters of the plurality of power conversion units was activated during the discharge. This, in turn, makes it possible to reduce the difference between the charge current and discharge current that flow to a single current detector, and therefore even if a current detector having a resolution appropriate for the magnitude of the discharge current is used, the charge current can be detected more accurately than if a subset of the DC power converters was activated during the discharge.

In the power converter according to the aspect described above, the controller may change a number of active DC power converters in the subset for charging the electrical storage unit on the basis of the charging current value detected by the current detectors. Here, the charge current that flows to a single current detector takes a value equal to the charge current that flows to the electrical storage unit divided by the number of active DC power converters in the subset that performs the charging operation. Therefore, changing the number of active DC power converters in the subset that performs the charging operation on the basis of the current values detected by the current detectors makes it possible to easily change the amount of current that flows to a single current detector. In this way, when the number of active DC power converters in the subset that performs the charging operation is changed so as to reduce the number of active DC power converters in the subset that performs the charging operation, the current that flows to a single current detector can be increased. As a result, the charge current can be detected more accurately than if the electrical storage unit was charged using all of the DC power converters.

In the power converter according to the aspect described above, each of the plurality of power conversion units may further include an AC power converter that converts the DC power from the rectifier or DC power from the DC converter when the electrical storage unit is discharging into AC power and supplies the AC power to a load, and the controller may change a number of active DC power converters in the subset when charging the electrical storage unit on the basis of current flowing from the AC power converters to the load. Here, the current that flows from the rectifiers is divided between current that flows to the load via the AC power converters and the charge current that flows to the electrical storage unit via the DC power converters, and therefore the charge current that flows to the electrical storage unit via the DC power converters changes depending on the current that flows to the load via the AC power converters. Therefore, by changing the number of active DC power converters in the subset that performs the charging operation on the basis of the current that flows to the load from the AC power converters, the number of active DC power converters in the subset that performs the charging operation can be optimized on the basis of the relationship between the magnitudes of the charge current necessary to charge the electrical storage unit and the charge current that flows from a single DC power converter. This makes it possible to prevent the electrical storage unit from being overcharged due to there being an excessive number of active DC power converters in the subset that performs the charging operation and further makes it possible to inhibit degradation of the electrical storage unit. This also makes it possible to prevent the electrical storage unit from being inadequately charged due to there being an inadequate number of active DC power converters in the subset that performs the charging operation.

In the power converter according to the aspect described above, the controller may select the DC power converters in the subset that charges the electrical storage unit based on priority rankings that are assigned to the respective DC power converters of the plurality of power conversion units. This configuration eliminates the need to perform control for determining the priority rankings on the basis of the states of the DC power converters, thereby making it possible to prevent increases in the control load of the power converter.

In this case, the priority rankings used to select the DC power converters in the subset from among the DC power converters of the plurality of power conversion units may be updated each time a prescribed period of time elapses. This configuration, in comparison to when the priority rankings are fixed, makes it possible to reduce the amount of time a particular DC power converter (the DC power converter with the highest priority ranking when the priority rankings are fixed) operates alone. As a result, degradation of particular DC power converters can be inhibited.

In the power converter according to the aspect described above, the controller may determine the priority rankings on the basis of cumulative operation times of the DC power converters or temperatures of cooling air that cools the DC power converters. This configuration makes it possible to prevent DC power converters with longer cumulative operation times and a greater degree of degradation or DC power converters with a high temperature from being used to charge the electrical storage unit. This, in turn, makes it possible to inhibit degradation of (damage to) the DC power converters.

As described above, the present invention makes it possible to improve charge current control accuracy.

It is to be understood that both the foregoing general description and the following detailed description are exemplary and explanatory, and are intended to provide further explanation of the invention as claimed.

DETAILED DESCRIPTION OF EMBODIMENTS

Next, specific embodiments of the present invention will be described with reference to figures.

Embodiment 1

The configuration of a power converter 100 according to Embodiment 1 of the present invention will be described with reference to FIGS. 1 and 2.

Configuration of Power Converter

First, the configuration of the power converter 100 (an uninterruptible power supply) will be described with reference to FIG. 1. Note that in Embodiment 1, the configuration of the power converter 100 will be described for a case in which the power converter 100 is an uninterruptible power supply.

Figure 1:
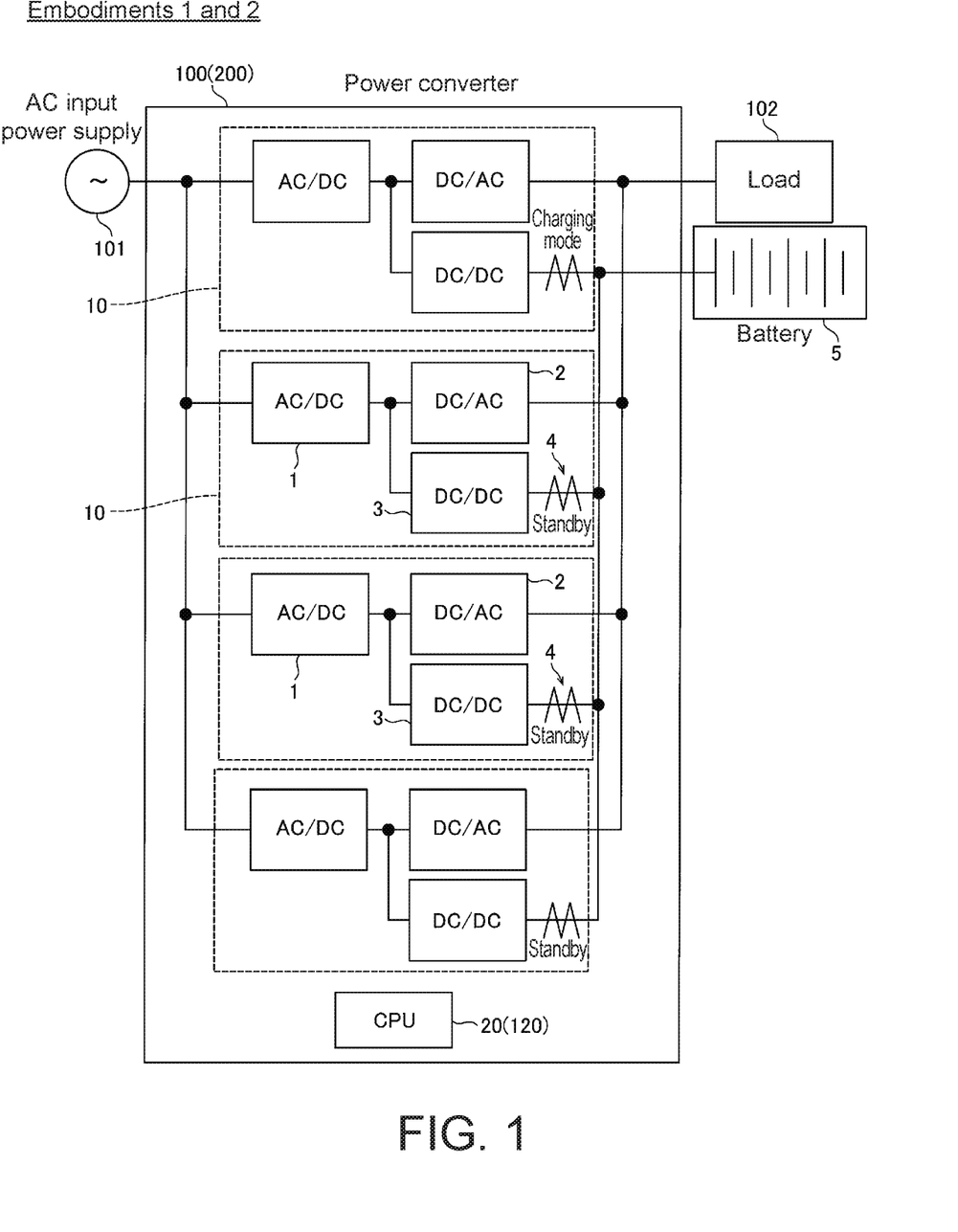
FIG. 1 illustrates the configuration of a power converter according to Embodiments 1 and 2 of the present invention.

As illustrated in FIG. 1, the power converter 100 includes a plurality of (in Embodiment 1, four) power conversion units 10 which are connected to one another in parallel. AC power from a commercial AC input power supply 101 is supplied to each of the plurality of power conversion units 10. Although here the AC input power supply 101 is a three-phase AC power supply, the AC input power supply 101 may alternatively be a single-phase power supply. Moreover, the AC input power supply 101 is an example of a "commercial power supply".

Each of the plurality of power conversion units 10 includes an AC/DC converter 1 which converts AC power from the AC input power supply 101 into DC power. Here, the AC/DC converter 1 is an example of a "rectifier".

Each of the plurality of power conversion units 10 further includes a DC/AC converter 2 which converts the DC power from the AC/DC converter 1 into AC power and supplies this power to a load 102. Here, the DC/AC converter 2 is an example of an "AC power converter".

Each of the plurality of power conversion units 10 also includes a DC/DC converter 3 which converts the DC power from the AC/DC converter 1. More specifically, during charging of a battery 5 (described below), the DC/DC converter 3 steps down the DC power from the AC/DC converter 1. Moreover, during discharge of the battery 5, the DC/DC converter 3 steps up DC power from the battery 5. Here, the DC/DC converter 3 is an example of a "DC power converter".

Each of the plurality of power conversion units 10 includes current detectors 4. The current detectors 4 of the respective plurality of power conversion units 10 detect current between the DC/DC converter 3 and the below-described battery 5 (charge current that flows from the DC/DC converter 3 to the battery 5, as well as discharge current that flows from the battery 5 to the DC/DC converter 3).

The power converter 100 includes a battery 5 (a lead-acid battery, for example) that is connected to the DC/DC converter 3 of the plurality of power conversion units 10. In other words, the battery 5 is a shared battery for the plurality of power conversion units 10. Note that although here the battery 5 is configured to be shared by the plurality of power conversion units 10, the number of batteries is not limited to one. Moreover, the battery 5 is an example of an "electrical storage unit".

During normal operation in which AC power from the commercial AC input power supply 101 is being supplied normally, the power converter 100 (DC/DC converters 3) uses the DC/DC converters 3 to step down the DC power from the AC/DC converters 1 and charge the battery 5. Moreover, during power outages in which the supply of AC power from the commercial AC input power supply 101 is cut off, the power converter 100 (DC/DC converters 3) uses the DC/DC converters 3 to step up the DC power from the battery 5 for supply (discharge) to the DC/AC converters 2.

The power converter 100 further includes a CPU 20 which controls the DC/DC converters 3 of the plurality of power conversion units 10. The CPU 20 is an example of a "controller".

Configuration of Power Conversion Unit

Next, the detailed configuration of the power conversion unit 10 will be described with reference to FIG. 2.

Figure 2:
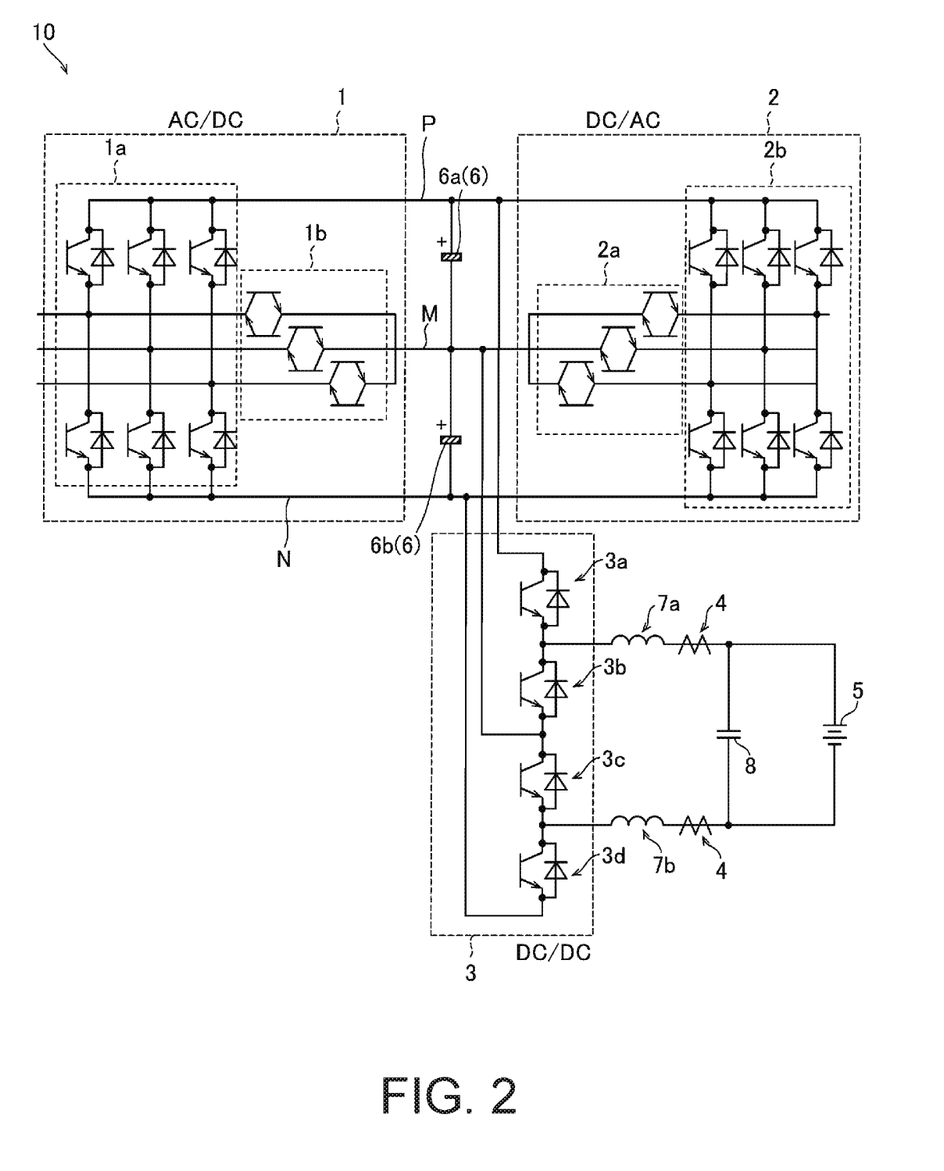
FIG. 2 illustrates the detailed configuration of a power conversion unit of the power converter according to Embodiments 1 and 2.

As illustrated in FIG. 2, the AC/DC converter 1 includes a bridge circuit unit 1a to which AC power from the AC input power supply 101 is input, and a reverse-blocking IGBT unit 1b which is connected to the bridge circuit unit 1a. The bridge circuit unit 1a includes IGBT devices and diodes which are connected in anti-parallel to these IGBT devices. The reverse-blocking IGBT unit 1b includes reverse-blocking IGBTs which are connected to one another in anti-parallel.

The DC/AC converter 2 includes a reverse-blocking IGBT unit 2a to which intermediate power from an electrolytic capacitor 6 (described later) is input, and bridge circuit unit 2b which is connected to the reverse-blocking IGBT unit 2a. The reverse-blocking IGBT unit 2a includes reverse-blocking IGBTs which are connected to one another in anti-parallel. The bridge circuit unit 2b includes IGBT devices and diodes which are connected in anti-parallel to these IGBT devices.

An electrolytic capacitor 6 which smooths the DC power from the AC/DC converter 1 is arranged between the AC/DC converter 1 and the DC/AC converter 2. The electrolytic capacitor 6 includes a positive-side capacitor 6a and a negative-side capacitor 6b. A positive-side terminal of the capacitor 6a is connected to a positive-side busbar P between the bridge circuit unit 1a and the bridge circuit unit 2b. Moreover, a negative-side terminal of the capacitor 6b is connected to a negative-side busbar N between the bridge circuit unit 1a and the bridge circuit unit 2b. Furthermore, a negative-side terminal of the capacitor 6a and a positive-side terminal of the capacitor 6b are respectively connected to an intermediate busbar M between the reverse-blocking IGBT unit 1b and the reverse-blocking IGBT unit 2a.

The DC/DC converter 3 includes IGBTs 3a to 3d which are connected to one another in series. The IGBTs 3a to 3d are connected in the order IGBT 3a, IGBT 3b, IGBT 3c, and IGBT 3d starting from the positive side. A positive-side terminal of the IGBT 3a is connected to the positive-side busbar P. A negative-side terminal of the IGBT 3d is connected to the negative-side busbar N. A node between the IGBT 3b and the IGBT 3c is connected to the intermediate busbar M. Note that although in the present embodiment the intermediate busbars M are not electrically connected across each of the plurality of power conversion units 10, these intermediate busbars M may be connected to one another.

Each of the plurality of power conversion units 10 further includes a reactor 7a and a reactor 7b. The reactor 7a is connected to between the IGBT 3a and the IGBT 3b. Moreover, the reactor 7b is connected to between the IGBT 3c and the IGBT 3d. A capacitor 8 is arranged between the reactor 7a and the reactor 7b. The battery 5 is connected in parallel to the capacitor 8. Although as is illustrated in FIG. 2 each of the plurality of power conversion units 10 is a three-level power conversion circuit, each may alternatively be a two-level power conversion circuit. Furthermore, there are two of the current detectors 4: one on the reactor 7a side and one on the reactor 7b side.

In Embodiment 1, the battery 5 is charged by a subset of DC/DC converters 3 among the DC/DC converters 3 of the plurality of power conversion units 10. More specifically, the battery 5 is charged by the DC/DC converter(s) 3 of one, two, or three of the power conversion units 10 among the four power conversion units 10. Note that FIG. 1 depicts a state in which the battery 5 is being charged by a single one of the DC/DC converters 3. Moreover, control within the power converter 100 for operations such as selecting DC/DC converters 3 during charging of the battery 5 (this control will be described later) is handled by the CPU 20, which is shared by the plurality of power conversion units 10. In other words, the CPU 20 is configured to control each of the plurality of power conversion units 10.

The CPU 20 performs control of switching the IGBTs 3a to 3d ON and OFF in the DC/DC converters 3 that are being used to charge the battery 5. The CPU 20 also performs control of keeping the IGBTs 3a to 3d in a gate-off state in the DC/DC converters 3 that are not being used to charge the battery 5.

When the number of DC/DC converters 3 in the subset is more than one (i.e., two or three), the CPU 20 performs control of making the output value of the current from each of the DC/DC converters 3 in the subset respectively take a value equal to the total charge current that flows to the battery 5 divided by the number of DC/DC converters 3 in the subset.

Moreover, when the number of DC/DC converters 3 in the subset is one, the output value of the current from that DC/DC converter 3 becomes two (or three) times the output value taken when the number of DC/DC converters 3 in the subset is two (or three). In this case only a single DC/DC converter 3 is operating, and therefore flow of circulating current is suppressed between the DC/DC converters 3 that are connected in parallel. Here, the circulating current refers to current that flows along paths between the DC/DC converters 3, between the DC/DC converters 3 and the AC/DC converters 1, and between the AC/DC converters 1.

The CPU 20 performs control of determining the magnitude of the charge current that flows to the battery 5 and the magnitude of the discharge current that flows from the battery 5 on the basis of factors such as the state of charge, temperature, and internal pressure of the battery 5. Here, the magnitude of the charge current that flows to the battery 5 is less than or equal to $1/10$ ($1/20$, for example) the magnitude of the discharge current that flows from the battery 5.

In Embodiment 1, when charging the battery 5, the CPU 20 activates a subset of DC/DC converters 3 among the DC/DC converters 3 of the plurality of power conversion units 10, and when discharging from the battery 5, the CPU 20 activates all of the DC/DC converters 3 of the plurality of power conversion units 10. In other words, the discharge current that flows to a single current detector 4 takes a value equal to the total discharge current that flows from the battery 5 divided by 4.

In addition, the CPU 20 changes the number of active DC/DC converters 3 in the subset on the basis of the current values detected by the current detectors 4. More specifically, as the current values detected by the current detectors 4 decrease, the CPU 20 decreases the number of active DC/DC converters 3 in the subset that performs the charging operation.

In particular, the number of DC/DC converters 3 in the subset that performs the charging operation is decreased when the battery 5 is close to fully charged, when the temperature of the battery 5 gets high, and when the internal pressure of the battery 5 gets high, for example. For example, using the state of charge of the battery 5 as an example, it may be configured such that three of the DC/DC converters 3 are activated when the state of charge of the battery 5 is less than or equal to 50% and one of the DC/DC converters 3 is activated when the state of charge of the battery 5 is greater than or equal to 90%.

Moreover, in Embodiment 1, the CPU 20 selects the DC/DC converters 3 in the subset that charges the battery 5 in order starting from the DC/DC converter 3 with the highest prescribed priority ranking among the DC/DC converters 3 of the plurality of power conversion units 10. More specifically, among the DC/DC converters 3 illustrated in FIG. 1, the priority rankings are assigned from top towards bottom, starting from the uppermost DC/DC converter 3. Below, the four DC/DC converters 3 illustrated in FIG. 1 will be referred to, in order from the top, as the #1 DC/DC converter 3, the #2 DC/DC converter 3, the #3 DC/DC converter 3, and the #4 DC/DC converter 3.

Here, when the number of DC/DC converters 3 in the subset that performs the charging operation is one, only the #1 DC/DC converter 3 is selected (activated) when charging the battery 5. Moreover, when the number of DC/DC converters 3 in the subset that performs the charging operation is two, the #1 and #2 DC/DC converters 3 are selected (activated) when charging the battery 5. Furthermore, when the number of DC/DC converters 3 in the subset that performs the charging operation is three, the #1, #2, and #3 DC/DC converters 3 are selected (activated) when charging the battery 5. Here, these prescribed priority rankings are maintained and never changed.

In addition, when there is a broken DC/DC converter 3 among the four DC/DC converters 3, for example, the selections are made in order starting from the DC/DC converter 3 with the highest priority ranking excluding the broken DC/DC converter 3 when charging the battery 5.

Effects of Embodiment 1

Embodiment 1 makes it possible to achieve the following advantageous effects.

As described above, in Embodiment 1 the power converter 100 is configured to include the battery 5 that is charged by a subset of DC/DC converters 3 among the DC/DC converters 3 of the plurality of power conversion units 10, as well as the CPU 20 that controls the DC/DC converters 3 of the plurality of power conversion units 10. Here, the charge current that flows to a single current detector 4 takes a value equal to the charge current that flows to the battery 5 divided by the number of power conversion units 10 (DC/DC converters 3) being used for charging. Thus, charging the battery 5 using a subset of DC/DC converters 3 among the DC/DC converters 3 of the plurality of power conversion units 10 makes it possible to increase the charge current that flows to a single current detector 4 in comparison to if all of the DC/DC converters 3 were used for charging. As a result, even if in order to detect the discharge current a current detector 4 with relatively low resolution is used to detect current, the charge current can be detected more accurately than if the battery 5 was charged using all of the DC/DC converters 3, thereby making it possible to improve charge current control accuracy.

Furthermore, as described above, in Embodiment 1 the power converter 100 is configured such that when charging the battery 5, the CPU 20 activates a subset of DC/DC converters 3 among the DC/DC converters 3 of the plurality of power conversion units 10, and when discharging from the battery 5, the CPU 20 activates all of the DC/DC converters 3 of the plurality of power conversion units 10. This makes it possible to make the discharge current that flows to a single current detector 4 smaller than if a subset of the DC/DC converters 3 of the plurality of power conversion units 10 was activated during the discharge. This, in turn, makes it possible to reduce the difference between the charge current and discharge current that flow to a single current detector 4, and therefore even if a current detector 4 having a resolution appropriate for the magnitude of the discharge current is used, the charge current can be detected more accurately than if a subset of the DC/DC converters 3 was activated during the discharge.

Furthermore, as described above, in Embodiment 1 the power converter 100 is configured such that the CPU 20 changes the number of active DC/DC converters 3 in the subset on the basis of the current values detected by the current detectors 4. Here, the charge current that flows to a single current detector 4 takes a value equal to the charge current that flows to the battery 5 divided by the number of active DC/DC converters 3 in the subset that performs the charging operation. Therefore, changing the number of active DC/DC converters 3 in the subset that performs the charging operation on the basis of the current values detected by the current detectors 4 makes it possible to easily change the amount of current that flows to a single current detector 4. In this way, when the number of active DC/DC converters 3 in the subset that performs the charging operation is changed so as to reduce the number of active DC/DC converters 3 in the subset that performs the charging operation, the current that flows to a single current detector 4 can be increased. As a result, the charge current can be detected more accurately than if the battery 5 was charged using all of the DC/DC converters 3.

Moreover, as described above, in Embodiment 1 the power converter 100 is configured such that the CPU 20 selects the DC/DC converters 3 in the subset that charges the battery 5 in order starting from the DC/DC converter 3 with the highest prescribed priority ranking among the DC/DC converters 3 of the plurality of power conversion units 10. This eliminates the need to perform control for determining the priority rankings on the basis of the states of the DC/DC converters 3, thereby making it possible to prevent increases in the control load of the power converter 100.

Embodiment 2

Next, the configuration of a power converter 200 according to Embodiment 2 of the present invention will be described with reference to FIGS. 1 and 3. Unlike in the power converter 100 according to Embodiment 1 in which the priority rankings of the DC/DC converters 3 that are selected when charging the battery 5 are determined in advance, in the power converter 200 according to Embodiment 2 the priority rankings of the DC/DC converters 3 that are selected when charging the battery 5 are changed on the basis of the states of the power conversion units 10. Note that components that are the same as in Embodiment 1 above will be given the same reference characters as in Embodiment 1 and will not be described again here.

As illustrated in FIG. 1, control within the power converter 200 for operations such as selecting DC/DC converters 3 during charging of the battery 5 is handled by a CPU 120, which is shared by the plurality of power conversion units 10. The CPU 120 is an example of a "controller".

Figure 3:
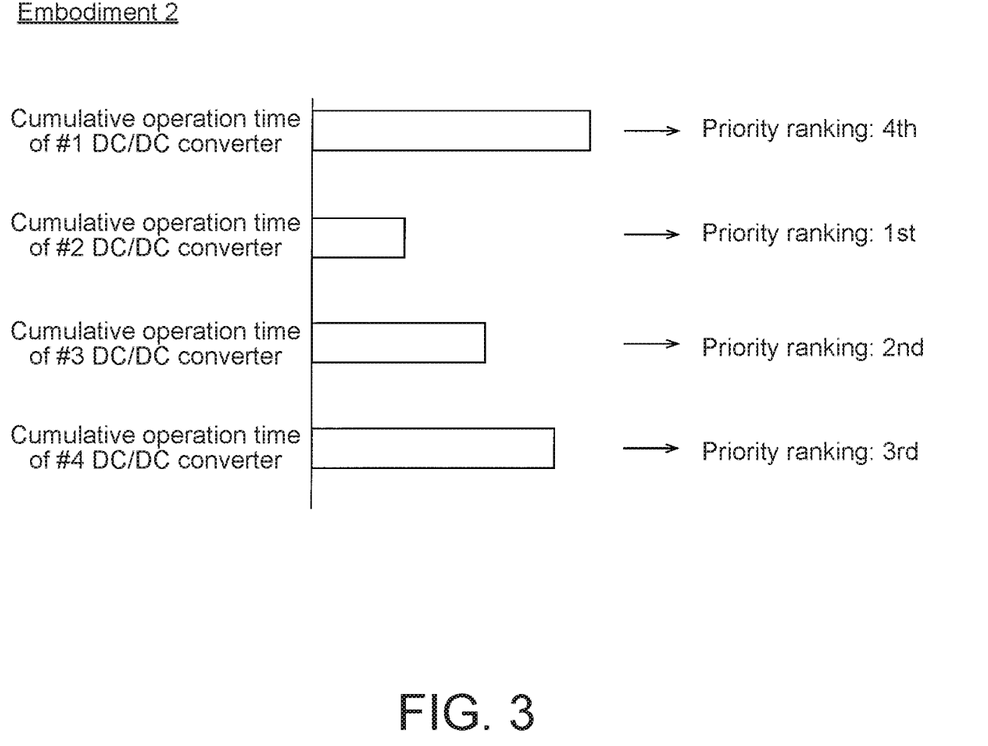
FIG. 3 illustrates the relationship between cumulative operation times and priority rankings of DC/DC converters in Embodiment 2.

Here, as illustrated in FIG. 3, in Embodiment 2 the CPU 120 selects the DC/DC converters 3 in the subset that charges the battery 5 in order starting from the DC/DC converter 3 with the highest priority ranking, as determined on the basis of the cumulative operation times of the DC/DC converters 3, among the DC/DC converters 3 of the plurality of power conversion units 10. More specifically, the CPU 120 assigns the priority rankings used for selection when charging the battery 5 such that the shorter the cumulative operation time, the higher the priority among the plurality of DC/DC converters 3.

For example, as illustrated in FIG. 3, if the cumulative operation times in order from longest to shortest are #1 DC/DC converter 3, #4 DC/DC converter 3, #3 DC/DC converter 3, and #2 DC/DC converter 3, then the priority rankings in order from highest to lowest are #2 DC/DC converter 3, #3 DC/DC converter 3, #4 DC/DC converter 3, and #1 DC/DC converter 3.

Moreover, if while charging the battery 5 the cumulative operation time of any of the active DC/DC converters 3 exceeds the cumulative operation time of an inactive DC/DC converter 3, then the DC/DC converters 3 to be used for charging may be changed the next time the battery 5 is charged (by applying a change to the priority rankings), or the DC/DC converters 3 used for charging may be changed as soon as that cumulative operation time is exceeded.

The rest of the configuration of Embodiment 2 is the same as that of Embodiment 1 as described above.

Effects of Embodiment 2

Embodiment 2 makes it possible to achieve the following advantageous effects.

As described above, in Embodiment 2 the power converter 200 is configured such that the CPU 120 selects the DC/DC converters 3 in the subset that charges the battery 5 in order starting from the DC/DC converter 3 with the highest priority ranking, as determined on the basis of the cumulative operation times of the DC/DC converters 3, among the DC/DC converters 3 of the plurality of power conversion units 10. This makes it possible to prevent DC/DC converters 3 with longer cumulative operation times and a greater degree of degradation from being used to charge the battery 5. This, in turn, makes it possible to inhibit degradation of (damage to) the DC/DC converters 3.

The rest of the effects of Embodiment 2 are the same as in Embodiment 1.

Modification Examples

It should be noted that in all respects, the embodiments described above are only examples and do not limit the present invention in any way. The scope of the present invention is defined by the claims, not by the descriptions of the embodiments above. Furthermore, the scope of the present invention also includes all changes (modification examples) made within the scope of the claims and their equivalents.

For example, although in Embodiments 1 and 2 above the number of active DC/DC converters 3 (DC power converters) in the subset was described as being changed on the basis of the detected values from the current detectors 4 as an example, the present invention is not limited to this example. For example, the number of active DC/DC converters 3 (DC power converters) in the subset may be changed on the basis of the current flowing to the load 102 from the DC/AC converters 2 (AC power converters).

Figure 4:
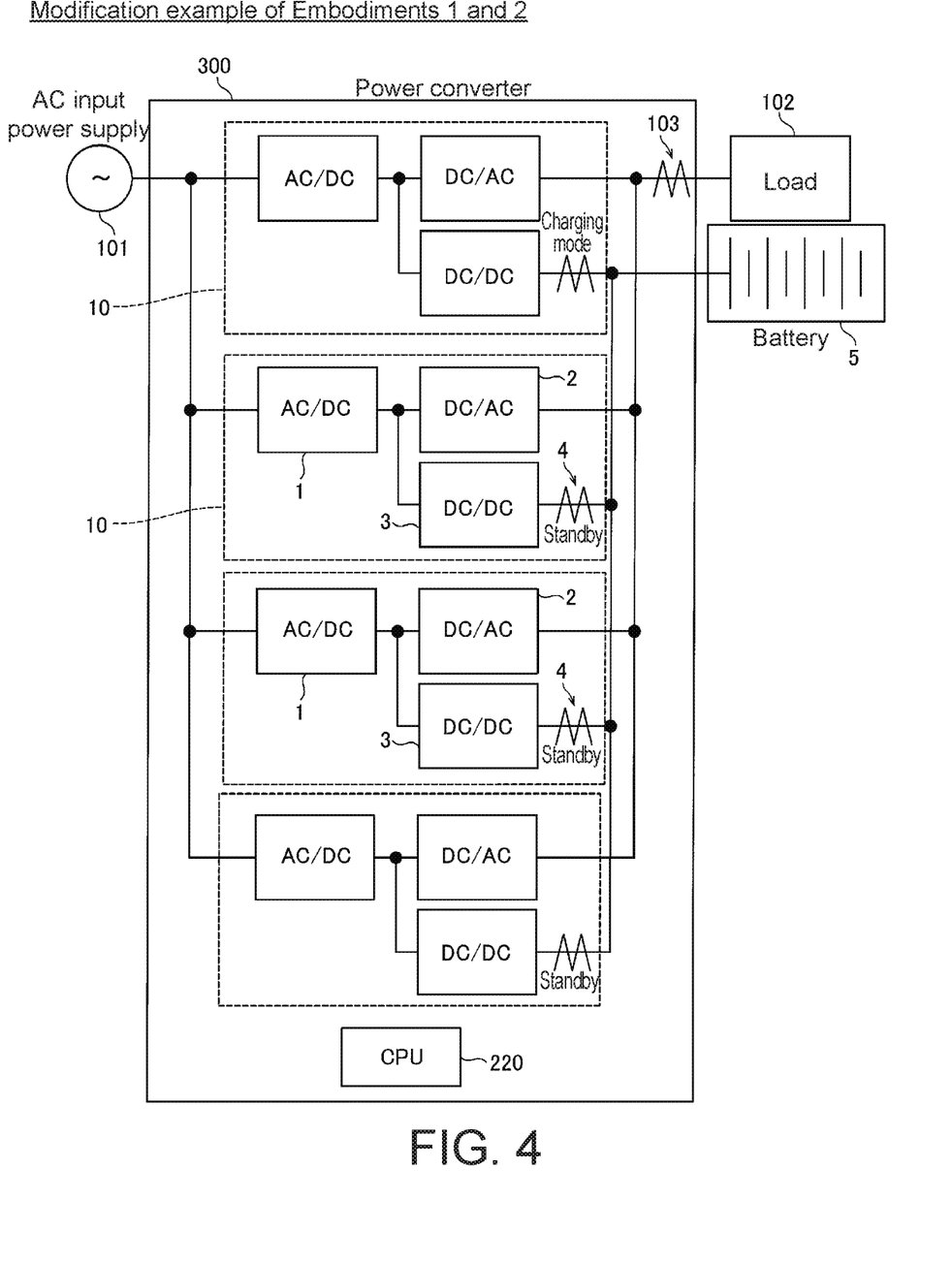
FIG. 4 illustrates the configuration of a power converter according to a modification example of Embodiments 1 and 2.

More specifically, as illustrated in FIG. 4, a power converter 300 includes a current detector 103 which detects current that flows to the load 102 from the plurality of power conversion units 10. A CPU 220 controls the operation of the plurality of power conversion units 10 on the basis of the current value detected by the current detector 103. Here, the (single) current detector 103 is shared by the plurality of power conversion units 10. Moreover, the CPU 220 is an example of a "controller".

The CPU 220 changes the number of active DC/DC converters 3 in the subset on the basis of the detected value from the current detector 103. In this case, when the detected value from the current detector 103 is relatively large (the load 102 is relatively heavy), the number of active DC/DC converters 3 (DC power converters) in the subset that performs the charging operation is controlled to become relatively larger. In contrast, when the detected value from the current detector 103 is relatively small (the load 102 is relatively light), the number of active DC/DC converters 3 (DC power converters) in the subset that performs the charging operation is controlled to become relatively smaller. Furthermore, the number of active DC/DC converters 3 (DC power converters) in the subset that performs the charging operation may be changed on the basis of both the detected value from the current detector 103 and the detected values from the current detectors 4.

Here, the current that flows from the AC/DC converters 1 is divided between current that flows to the load 102 via the DC/AC converters 2 and the charge current that flows to the battery 5 via the DC/DC converters 3, and therefore the charge current that flows to the battery 5 via the DC/DC converters 3 changes depending on the current that flows to the load 102 via the DC/AC converters 2. Therefore, by changing the number of active DC/DC converters 3 in the subset that performs the charging operation on the basis of the current that flows to the load 102 from the DC/AC converters 2, the number of active DC/DC converters 3 in the subset that performs the charging operation can be optimized on the basis of the relationship between the magnitudes of the charge current necessary to charge the battery 5 and the charge current that flows from a single DC/DC converter 3. This makes it possible to prevent the battery 5 from being overcharged due to there being an excessive number of active DC/DC converters 3 in the subset that performs the charging operation and further makes it possible to inhibit degradation of the battery 5. This also makes it possible to prevent the battery 5 from being inadequately charged due to there being an inadequate number of active DC/DC converters 3 in the subset that performs the charging operation. Note also that the current that flows to the load 102 may alternatively be obtained by arranging a current detector on the output line of each DC/AC converter 2 and then individually detecting and adding together the respective output currents.

Furthermore, although in Embodiment 1 above the priority rankings of the DC/DC converters 3 (DC power converters) selected when charging the battery 5 (electrical storage unit) were described as being maintained and never being changed as an example, the present invention is not limited to this example. For example, the priority rankings used to select the DC/DC converters 3 (DC power converters) in the subset that performs the charging operation from among the DC/DC converters 3 (DC power converters) of the plurality of power conversion units 10 may be changed each time a prescribed period of time elapses. For example, the priority rankings used to select the DC/DC converters 3 (DC power converters) may be automatically changed every one week. Here, one week is an example of a "prescribed period of time".

This, in comparison to when the priority rankings are fixed, makes it possible to reduce the amount of time a particular DC/DC converter 3 (the DC/DC converter 3 with the highest priority ranking when the priority rankings are fixed) operates alone. As a result, degradation of particular DC/DC converters 3 can be inhibited.

In addition, although in Embodiment 2 above the DC/DC converters 3 (DC power converters) selected when charging the battery 5 (electrical storage unit) were described as being selected in order starting from the DC/DC converter 3 (DC power converter) with the highest priority ranking as determined on the basis of cumulative operation time as an example, the present invention is not limited to this example. For example, the selections may be made in order starting from the DC/DC converter 3 (DC power converter) with the highest priority ranking as determined on the basis of the temperature of cooling air that cools the DC/DC converters 3 (DC power converters).

Figure 5:
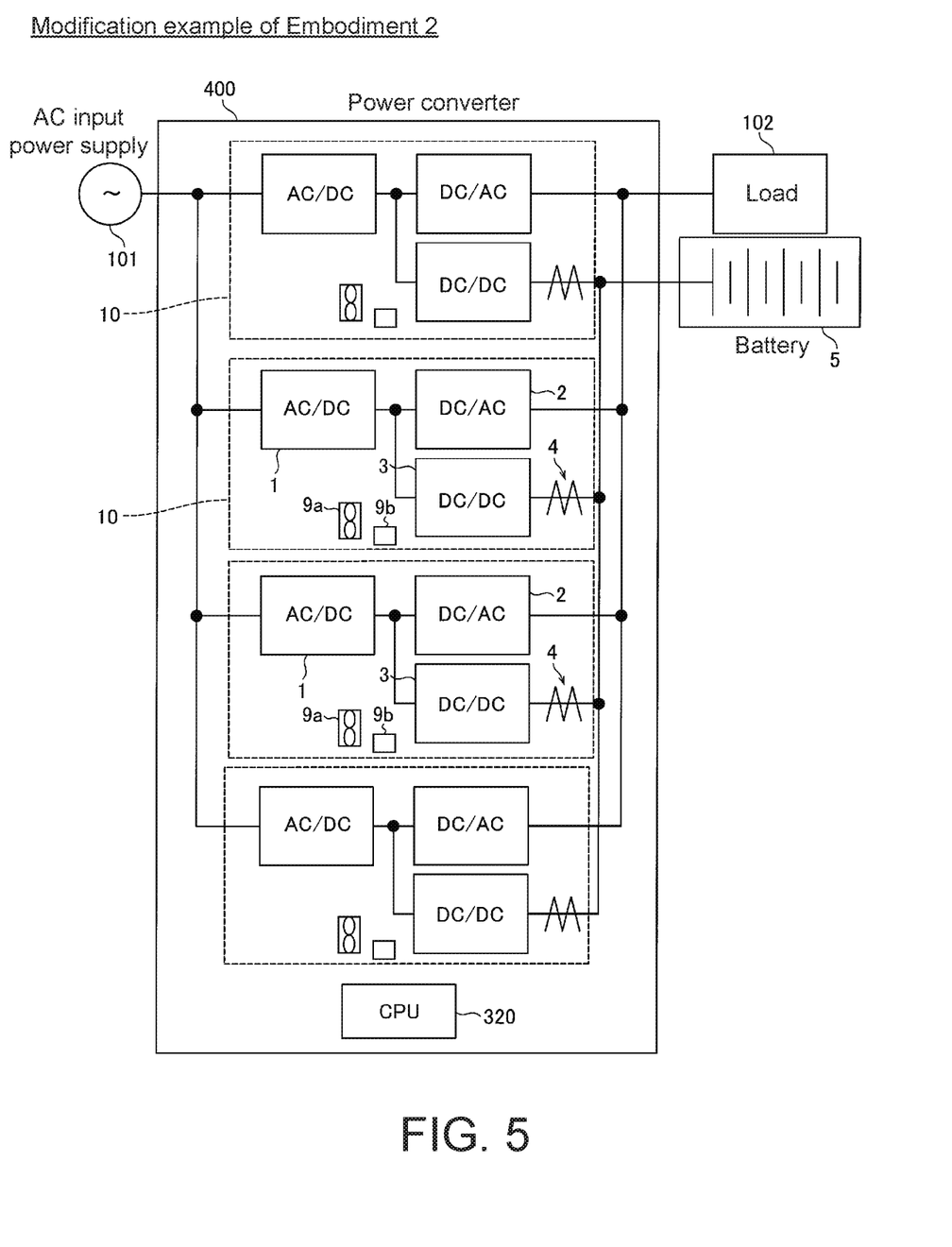
FIG. 5 illustrates the configuration of a power converter according to a modification example of Embodiment 2.

More specifically, as illustrated in FIG. 5, each of a plurality of power conversion units 10 of a power converter 400 includes a cooling fan 9a for cooling that power conversion unit 10 (DC/DC converter 3). Cooling air that cools the power conversion unit 10 (DC/DC converter 3) is drawn into the cooling fan 9a. Moreover, each of the plurality of power conversion units 10 includes a temperature sensor 9b which measures the temperature of the cooling air drawn in by the cooling fan 9a. The power converter 400 further includes a CPU 320. Here, the CPU 320 is an example of a "controller".

The CPU 320 sets the priority rankings to be highest in order starting from the power conversion unit 10 (DC/DC converter 3) for which the measured temperature from the temperature sensor 9b included in each of the plurality of power conversion units 10 is lowest. This makes it possible to prevent DC/DC converters 3 that have a high temperature from being used to charge the battery 5. This, in turn, makes it possible to inhibit degradation of (damage to) the DC/DC converters 3.

Moreover, although in Embodiments 1 and 2 above the number of active DC/DC converters 3 (DC power converters) in the subset was described as being changed on the basis of the detected values from the current detectors 4 as an example, the present invention is not limited to this example. For example, the number of active DC/DC converters 3 (DC power converters) selected when charging the battery 5 (electrical storage unit) may be fixed.

Furthermore, although in Embodiments 1 and 2 above an example in which four power conversion units 10 are connected in parallel was described, the present invention is not limited to this example. For example, as long as the plurality of power conversion units 10 are connected in parallel, the number thereof is not limited to being four.

In addition, although in Embodiments 1 and 2 above the power converter 100 (200) was described as being an uninterruptible power supply as an example, the present invention is not limited to this example. For example, the power converter may be a power conditioner.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:
1. A power converter, comprising:
   an electrical storage unit;
   a plurality of power conversion units connected to one another in parallel, each of the power conversion units including:
      a rectifier that converts AC power from a commercial power supply into DC power,
      a DC power converter that is connected to the rectifier on one end and connected to the electrical storage unit on another end and that converts the DC power from the rectifier when charging the electrical storage unit and converts DC power from the electrical storage unit when discharging the electrical storage unit, and
      a current detector that detects charge current that flows from the DC power converter to the electrical storage unit as well as discharge current that flows to the DC power converter from the electrical storage unit; and
   a controller that controls the respective DC power converters of the plurality of power conversion units such that when charging the electrical storage unit, only a subset of the DC power converters, not all of the DC power converters, among the respective DC power converters of the power conversion units charges the electrical storage unit, wherein each of the plurality of power conversion units further includes an AC power converter that converts the DC power from the rectifier or DC power from the DC converter when the electrical storage unit is discharging into AC power and supplies the AC power to a load, and wherein the controller changes a number of active DC power converters in the subset when charging the electrical storage unit on the basis of current flowing from the AC power converters to the load.

2. The power converter according to claim 1, wherein when discharging from the electrical storage unit, the controller activates all of the DC power converters of the plurality of power conversion units.

3. A power converter according to claim 1, comprising:
an electrical storage unit;
a plurality of power conversion units connected to one another in parallel, each of the power conversion units including:
 a rectifier that converts AC power from a commercial power supply into DC power,
 a DC power converter that is connected to the rectifier on one end and connected to the electrical storage unit on another end and that converts the DC power from the rectifier when charging the electrical storage unit and converts DC power from the electrical storage unit when discharging the electrical storage unit, and
 a current detector that detects charge current that flows from the DC power converter to the electrical storage unit as well as discharge current that flows to the DC power converter from the electrical storage unit; and
a controller that controls the respective DC power converters of the plurality of power conversion units such that when charging the electrical storage unit, only a subset of the DC power converters, not all of the DC power converters, among the respective DC power converters of the power conversion units charges the electrical storage unit,
wherein the controller changes a number of active DC power converters in the subset for charging the electrical storage unit on the basis of the charging current value detected by the current detectors.

4. A power converter, comprising:
an electrical storage unit;
a plurality of power conversion units connected to one another in parallel, each of the power conversion units including:
 a rectifier that converts AC power from a commercial power supply into DC power,
 a DC power converter that is connected to the rectifier on one end and connected to the electrical storage unit on another end and that converts the DC power from the rectifier when charging the electrical storage unit and converts DC power from the electrical storage unit when discharging the electrical storage unit, and
 a current detector that detects charge current that flows from the DC power converter to the electrical storage unit as well as discharge current that flows to the DC power converter from the electrical storage unit; and
a controller that controls the respective DC power converters of the plurality of power conversion units such that when charging the electrical storage unit, only a subset of the DC power converters, not all of the DC power converters, among the respective DC power converters of the power conversion units charges the electrical storage unit, wherein the controller selects the DC power converters in the subset that charges the electrical storage unit based on priority rankings that are assigned to the respective DC power converters of the plurality of power conversion units.

5. The power converter according to claim 4, wherein the priority rankings used to select the DC power converters in the subset from among the DC power converters of the plurality of power conversion units are updated each time a prescribed period of time elapses.

6. The power converter according to claim 4, wherein the controller determines the priority rankings on the basis of cumulative operation times of the DC power converters or temperatures of cooling air that cools the DC power converters.

7. The power converter according to claim 3, wherein when discharging from the electrical storage unit, the controller activates all of the DC power converters of the plurality of power conversion units.

8. The power converter according to claim 3, wherein the controller selects the DC power converters in the subset that charges the electrical storage unit based on priority rankings that are assigned to the respective DC power converters of the plurality of power conversion units.

9. The power converter according to claim 8, wherein the priority rankings used to select the DC power converters in the subset from among the DC power converters of the plurality of power conversion units are updated each time a prescribed period of time elapses.

10. The power converter according to claim 8, wherein the controller determines the priority rankings on the basis of cumulative operation times of the DC power converters or temperatures of cooling air that cools the DC power converters.

11. The power converter according to claim 4, wherein when discharging from the electrical storage unit, the controller activates all of the DC power converters of the plurality of power conversion units.

12. The power converter according to claim 4,
wherein each of the plurality of power conversion units further includes an AC power converter that converts the DC power from the rectifier or DC power from the DC converter when the electrical storage unit is discharging into AC power and supplies the AC power to a load, and
wherein the controller changes a number of active DC power converters in the subset when charging the electrical storage unit on the basis of current flowing from the AC power converters to the load.

13. The power converter according to claim 1,
wherein the controller selects the DC power converters in the subset that charges the electrical storage unit based on priority rankings that are assigned to the respective DC power converters of the plurality of power conversion units, and
wherein the priority rankings used to select the DC power converters in the subset from among the DC power converters of the plurality of power conversion units are updated each time a prescribed period of time elapses.

14. The power converter according to claim 1,
wherein the controller selects the DC power converters in the subset that charges the electrical storage unit based on priority rankings that are assigned to the respective DC power converters of the plurality of power conversion units, and wherein the controller determines the priority rankings on the basis of cumulative operation times of the DC power converters or temperatures of cooling air that cools the DC power converters.

* * * * *